No. 813,385. PATENTED FEB. 20, 1906.
F. W. KOONZ.
APPARATUS FOR TREATING AND ROASTING WASTE MATERIALS.
APPLICATION FILED DEC. 1, 1905.
2 SHEETS—SHEET 2.
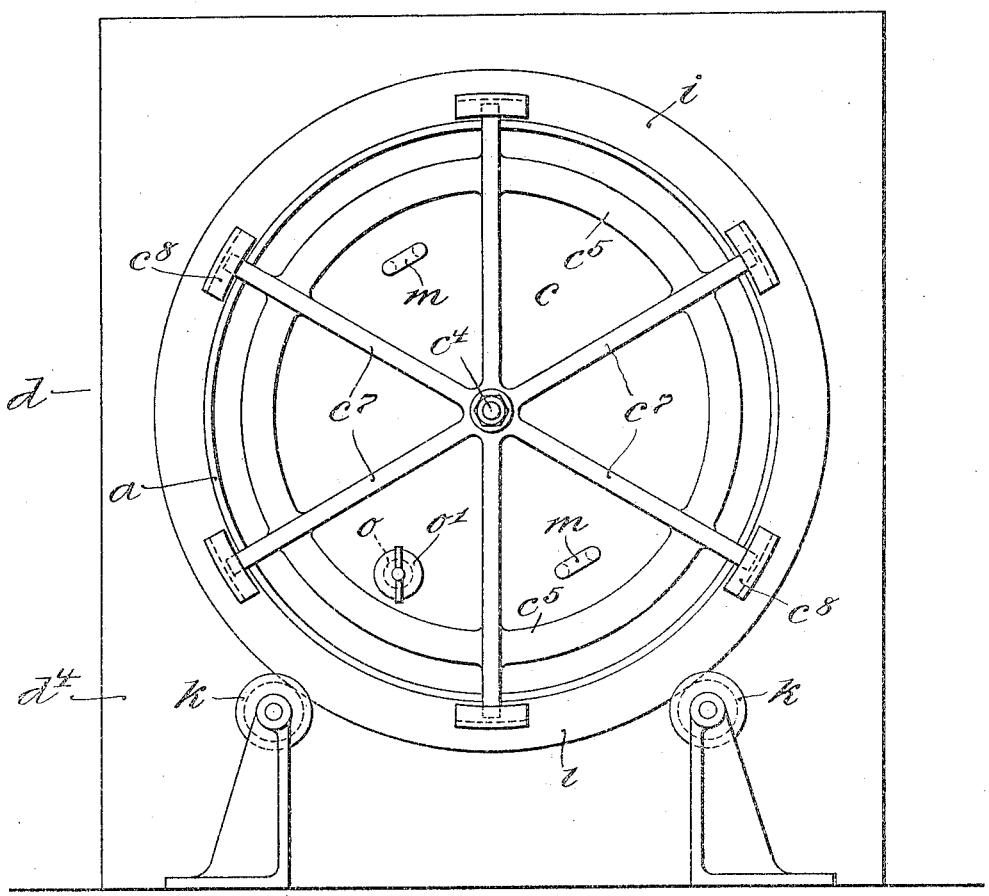
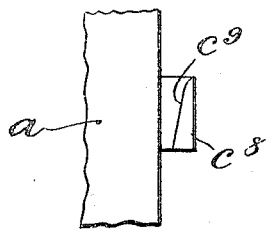
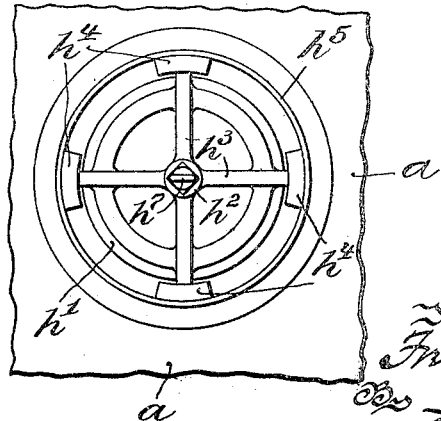
Witnesses:
Wilhelm Vogt
Thomas M. Smith
Inventor:
Frederick W. Koonz,
By J. Walter Douglas
Attorney

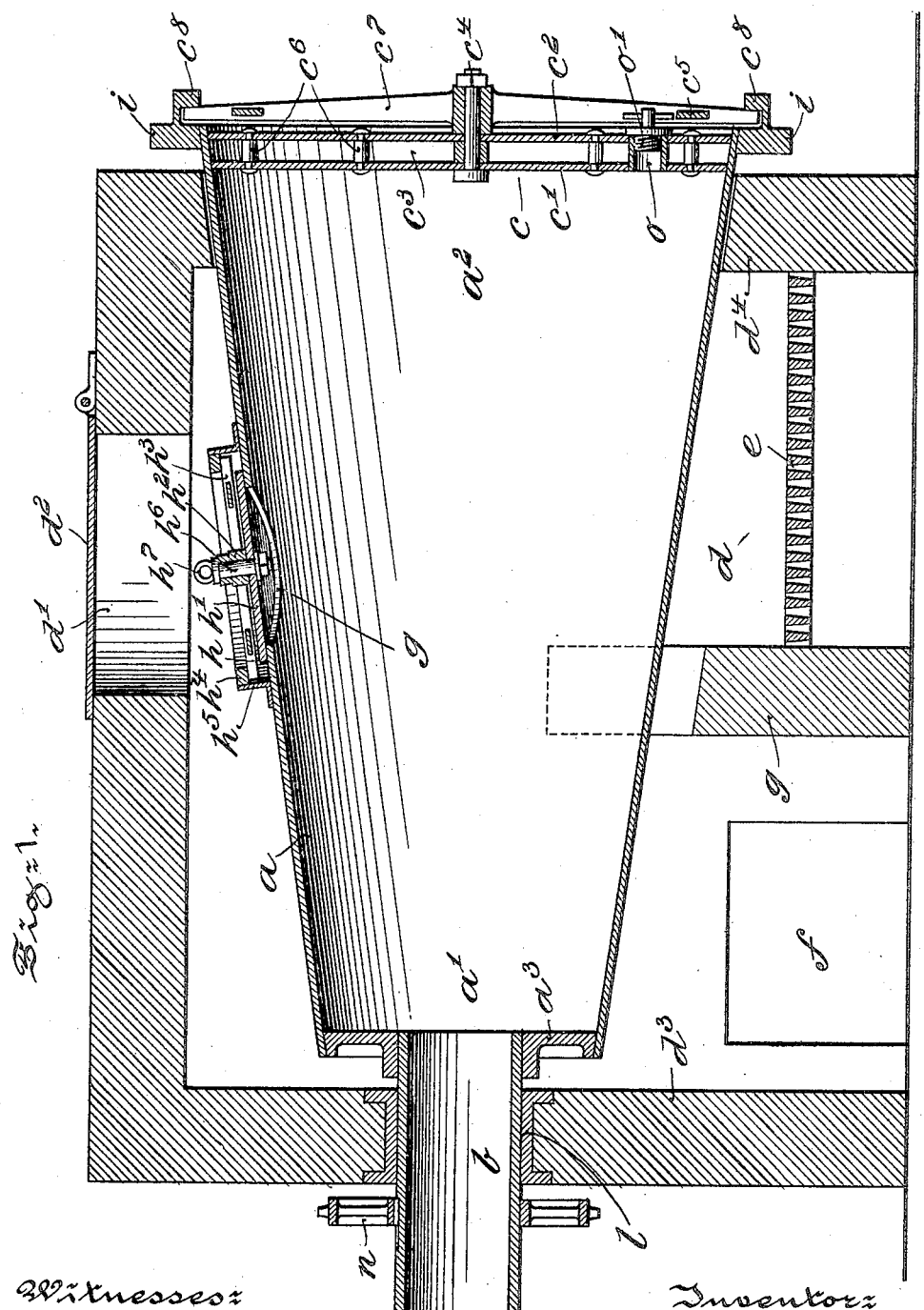

UNITED STATES PATENT OFFICE.

FREDERICK W. KOONZ, OF PHILADELPHIA, PENNSYLVANIA, ASSIGNOR TO J. WALTER DOUGLASS, TRUSTEE, OF PHILADELPHIA, PENNSYLVANIA.

APPARATUS FOR TREATING AND ROASTING WASTE MATERIALS.

No. 813,385.      Specification of Letters Patent.      Patented Feb. 20, 1906.

Application filed December 1, 1905. Serial No. 289,734.

*To all whom it may concern:*

Be it known that I, FREDERICK W. KOONZ, a citizen of the United States, residing at the city of Philadelphia, in the county of Philadelphia and State of Pennsylvania, have invented certain new and useful Improvements in Apparatus for Treating and Roasting Waste Materials, of which the following is a specification.

My invention has relation to an apparatus for treating and roasting waste matter; and in such connection it relates particularly to the construction and arrangement of such apparatus.

The principal objects of my invention are, first, to provide an apparatus for producing fertilizer components by a single operation from hair, fleshings, skivings from tanneries, kitchen and leather waste, and other similar materials by heating and driving off by evaporation the liquid matter therefrom and roasting remaining waste matter; second, to so shape a receiving receptacle or drum for the waste material as to insure an unaided discharge of the contents of the same when a closure of the receptacle or drum is removed therefrom; third, to so inclose the receptacle or drum by a furnace as to permit of the discharge of the contents without interfering with the heating action of the furnace, and, fourth, to permit of testing or examining its contents, without opening the receptacle or drum.

The nature and characteristic features of my invention will be more fully understood from the following description, taken in connection with the accompanying drawings, forming part hereof, in which—

Figure 1 is a longitudinal sectional view of an apparatus for treating and roasting waste matter, consisting of a receptacle or drum frusto-conical in outline and of a furnace partially surrounding the same embodying main features of my invention. Fig. 2 is an elevational view of the front or discharge end thereof. Fig. 3 is a top or plan view of a portion of the drum and of a cover or cap for closing an opening in the same, and Fig. 4 is a side elevational view of a portion of the receptacle or drum and of the projection of a ring carried by the drum and also showing the inclined surface of the projection.

Referring to the drawings, $a$ is a receptacle or drum, preferably frusto-conical in outline, which is closed at the end of smallest diameter $a'$ by a wall $a^3$. The wall $a^3$ serves to support a tube or cylindrical body arranged centrally therein, which tube forms an outlet for gaseous matter generated in the drum and for conducting the same to any suitable place of discharge—for instance, a chimney. (Not shown.) At the expanded end $a^2$ of greatest diameter the receptacle or drum $a$ is closed by a removable door $c$, preferably consisting of an inner door $c'$ and an outer door $c^2$, held certain distances apart by stay-bolts $c^6$, to form when the same closes the end $a^2$ of the receptacle or drum $a$ an air-chamber $c^3$. The object of this chamber is to prevent loss of heat from the receptacle or drum $a$ by radiation and at the same time to protect the closure from the influence of cold air tending to lower the temperature in the receptacle or drum $a$, and thus to retard the treatment of waste matter introduced into the same.

The door $c$ can be readily connected and disconnected from the receptacle or drum $a$ by the following preferred mechanism, to wit: To a bolt $c^4$ of the door $c$ are movably secured radial arms $c^7$, connected with each other adjacent to their free ends by ribs $c^5$, forming combined an annulus, as shown in Fig. 2. The ends of the arms $c^7$ when the door $c$ is to be closed are by a slight movement of their fulcral point $c^4$ from left to right in Fig. 2 brought into engagement with an inclined portion $c^9$ of projections or keeper-plates $c^8$, preferably formed integral with a ring $i$, surrounding the end $a^2$ of the receptacle or drum $a$, as shown in Figs. 1 and 2. By moving the arms $c^7$ along the inclined surface $c^9$ of each of the projections $c^8$ the door $c$ is forced into the receptacle or drum $a$ and against the interior surface of the same to thus form a liquid and gas proof joint between the inner surface of the receptacle or drum $a$ and the periphery of the doors $c'$ and $c^2$. At the same time any wear between the doors and the wall of the receptacle or drum $a$ can be readily compensated for by the inclined surface $c^9$ of the projection $c^8$. When the door $c$ is to be opened, a slight movement of the arms $c^7$ will bring the same out of engagement with the projection $c^8$, after which the door by means of the eyes $m$, secured thereto, can be moved from the receptacle or drum $a$ by any suitable means. (Not shown.)

Preferably intermediate of the ends the receptacle or drum $a$ is provided with an inlet-opening $g$, which when the receptacle or drum $a$ occupies the position shown in Fig. 1 permits of the introduction of waste matter into the same. The inlet-opening $g$ is normally closed by a door $h$, consisting of a disk $h'$, supporting by a bearing $h^2$ and bolt $h^6$ radial arms $h^3$, engaging keeper-plates $h^4$ of a cap $h^5$, secured to the receptacle $a$, as shown in Figs. 1 and 3. The bolt $h^6$ is provided with an eye $h^7$, by means of which the door $h$ may be readily lifted from or inserted into the cap $h^5$ to close the inlet-opening $g$.

As shown in Fig. 1, the receptacle or drum $a$ is surrounded to its end $a^2$ by a casing or housing forming a furnace $d$. This casing or housing may be formed of masonry or metal, (not shown,) in which latter instance the same may be lined with brick or may consist of a double metal shell, between which heat-non-conducting material can be placed. The tube or outlet $b$ of the receptacle or drum $a$ by passing through the wall $d^3$ of the furnace $d$ serves, in conjunction with the wall, to support the same at its end $a'$. A bearing $l$, inserted in the wall $d^3$, permits of a free rotation of the tube $b$ therein. At the end $a^2$ the receptacle or drum $a$ loosely passes through the wall $d^4$ of the furnace $d$ and extends beyond the same for a distance sufficient only to permit of an unimpaired support of the receptacle or drum $a$ by rollers $k$ engaging the ring $i$ thereof, as shown in Fig. 2.

The preferred means for rotating the receptacle or drum $a$ consists of a sprocket-wheel $n$, secured to the tube or outlet $b$, which sprocket-wheel when driven by means not shown imparts its rotary movement by the tube $b$ to the receptacle or drum $a$, rotating the same in the bearing $l$, and the rollers $k$. The waste matter introduced into the receptacle or drum $a$ will be loosened, agitated, and stirred by the rotation of the receptacle or drum $a$, and thus all parts thereof will be brought into contact with the heated walls of the same from the furnace. Furthermore, the liquid matter, if such is present in the waste material, will be removed therefrom by evaporation and by discharge through the outlet $b$, after which a rapid roasting of the remaining waste matter will be accomplished, which charred matter when ground is ready for use as a fertilizer component. The casing or housing $b'$ may be supplied with heat from any suitable source. However, in the present instance, as shown in Fig. 1, a grate $e$ is arranged below the receptacle or drum $a$ and adjacent to the expanded end $a^2$ of the same, so as to subject that portion of the receptacle or drum containing the greater amount of waste matter to the direct influence of heat from the grate $e$. An outlet $f$ for the products of combustion is arranged beyond the bridge-wall $g$, and at the lower part of the firechamber $d$, which prevents a ready withdrawal of heat generated in the furnace $d$ through the outlet $f$ thereof. In the wall of the upper portion of the furnace $d$ is arranged an opening $d'$, closed by a door $d^2$, through which when a door $h$ of the receptacle or drum $a$ has been opened waste matter is introduced into the receptacle or drum $a$. When the door $c$ is opened, the contents of the receptacle or drum $a$, owing to the conical shape of the same, will readily leave the receptacle and which is assisted in the discharge by the rotation of the receptacle or drum $a$. In order to permit of the examination of the contents of the receptacle or drum $a$, a peep-hole, consisting of a tubular body $o$, is arranged in the door $c$, which is normally closed by a removable cap $o'$. To prevent escape of gases from the receptacle or drum $a$ during examination of the contents thereof, the same is rotated so as to place the peep-hole $o$ in a position in which it is covered by the contents of the receptacle.

In order to determine the progress of the coking of the waste matter, a certain portion thereof can be readily removed therefrom by the opening of the cap $o'$, closing the peep-hole $o$. However, care must be exercised to bring the receptacle or drum $a$ to a standstill in the position shown in Fig. 1, in which the opening or peep-hole $o$ is closed by the waste material, as otherwise obnoxious gases may escape through the same during the testing of the contents of the receptacle or drum $a$. After the roasting of the waste matter has been completed in the receptacle or drum $a$ the door $c$ is opened and the charred matter readily discharged therefrom, owing to the frusto-conical shape of the receptacle or drum $a$, assisted by the rotary movement of the receptacle or drum $a$, which tends to conduct all waste matter toward the outlet thereof. In this manner no special means are required to discharge the contents of the drum or to hold the same in an oblique position, which would insure such discharge by gravity.

Having thus described the nature and objects of my invention, what I claim as new, and desire to secure by Letters Patent, is—

1. In an apparatus for treating and roasting waste matter, a receptacle or drum frusto-conical in outline, means for supporting said drum so as to hold the same with its central longitudinal axis in substantially a horizontal plane, a closure for said drum engaging the end having the greatest diameter, said drum arranged when rotated and when said closure is removed, to discharge the contents unaided.

2. In an apparatus for treating and roasting waste matter, a receptacle or drum frusto-conical in outline, an outlet arranged centrally to said drum and at the end of smallest diameter, a closure arranged at the end of greatest diameter, means for rotatably supporting said drum and for holding the same so that its central longitudinal axis is in substantially a horizontal plane, said drum arranged to receive waste matter and to remove liquid matter therefrom by evaporation through said outlet and when the closure is removed, to discharge the remaining matter unaided.

3. In an apparatus for treating and roasting waste matter, a receptacle or drum frustoconical in outline, an outlet arranged centrally to said drum and at the end of smallest diameter, a closure arranged at the end of greatest diameter, means for rotatably supporting said drum and for holding the same so that its central longitudinal axis is in substantially a horizontal plane, said drum arranged to receive waste matter and to remove liquid matter therefrom, by evaporation, through said outlet and when the closure is removed, to discharge the remaining matter unaided, and an inlet for waste matter arranged in said drum intermediate of said outlet and closure and means for closing said inlet.

4. In an apparatus for treating and roasting waste matter, a receptacle or drum frustoconical in outline, means for supporting said drum so as to hold the same with its central longitudinal axis in a horizontal plane, a closure for said drum engaging the end having the greatest diameter, said drum arranged when rotated and when said closure is removed, to discharge the contents unaided, and means arranged in said closure for removing portions of the contents when the closure engages said drum.

5. In an apparatus for treating and roasting waste matter, a receptacle or drum having open and closed ends, a tube forming an outlet for gaseous matter and supporting said receptacle at its closed end, a closure for said receptacle or drum, means for supporting said receptacle or drum at its open end, and means for surrounding said receptacle, said surrounding means arranged so as to permit of the heating of said receptacle or drum and of the discharge of the contents thereof, without loss of heat.

6. In an apparatus for treating and roasting waste matter, a receptacle or drum having open and closed ends, a tube forming an outlet for gaseous matter and supporting said receptacle or drum at its closed end, a closure for said receptacle or drum, means for supporting said receptacle or drum at its open end, an inlet-opening arranged in the body of said receptacle or drum, means for closing said inlet and means for rotating said tube and by the same, said receptacle or drum.

7. In an apparatus for treating and roasting waste matter, a receptacle or drum having open and closed ends, a tube forming an outlet for gaseous matter and supporting said receptacle at the closed end thereof, a closure for said receptacle or drum, at its open end, means surrounding said receptacle or drum and forming a furnace for the generation of heat and arranged so as to permit of discharge of the contents of said receptacle or drum, without loss of heat or interfering with the discharge of matter therefrom, means for supporting said receptacle or drum at its open end and beyond said furnace, an inlet arranged in said receptacle or drum, means for closing said inlet, means for rotating said tube and by the same said receptacle, and means arranged in the closure for said receptacle or drum for removing portions of the contents thereof, without removing said closure.

8. In an apparatus for treating and roasting waste matter, the combination of a frustoconical receptacle or drum having open and closed ends and mounted in a furnace having an opening in the top with a closure therefor, a grate in the bottom of said furnace and an outlet for the escape of products of combustion from said furnace, doors in the body and one end of said receptacle or drum, means for supporting said receptacle or drum at its open end and for permitting of rotation thereof in said furnace and means for holding the end door of said receptacle or drum in operative position against back pressure.

In witness whereof I have hereunto set my signature in the presence of two subscribing witnesses.

FREDERICK W. KOONZ.

Witnesses:
WILHELM VOGT,
THOMAS M. SMITH.